United States Patent
Wong et al.

(10) Patent No.: US 6,711,577 B1
(45) Date of Patent: Mar. 23, 2004

(54) DATA MINING AND VISUALIZATION TECHNIQUES

(75) Inventors: Pak Chung Wong, Richland, WA (US); Paul Whitney, Richland, WA (US); Jim Thomas, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 391 days.

(21) Appl. No.: 09/695,157

(22) Filed: Oct. 24, 2000

Related U.S. Application Data

(60) Provisional application No. 60/239,334, filed on Oct. 9, 2000.

(51) Int. Cl.$^7$ .............................................. G06F 17/30
(52) U.S. Cl. ........................ 707/101; 707/100; 345/419; 345/848; 345/968
(58) Field of Search ........................ 707/1–10, 100–103; 345/419, 440, 848, 849, 836, 968

(56) References Cited

U.S. PATENT DOCUMENTS

| | | | |
|---|---|---|---|
| 5,615,341 A | 3/1997 | Agrawal et al. ............. 395/210 |
| 5,664,174 A | 9/1997 | Agrawal et al. | |
| 5,701,400 A | 12/1997 | Amado ........................ 395/76 |
| 5,724,573 A | 3/1998 | Agrawal et al. ............. 395/606 |
| 5,727,199 A | 3/1998 | Chen et al. .................. 395/606 |
| 5,737,593 A | 4/1998 | Agrawal et al. | |
| 5,742,811 A | 4/1998 | Agrawal et al. ............. 395/606 |
| 5,794,209 A | 8/1998 | Agrawal et al. ............... 705/10 |
| 5,812,997 A | 9/1998 | Morimoto et al. ............... 707/2 |
| 5,813,003 A | 9/1998 | Chen et al. ...................... 707/6 |
| 5,819,266 A | 10/1998 | Agrawal et al. ................ 707/6 |
| 5,842,200 A | 11/1998 | Agrawal et al. ................ 707/1 |
| 5,861,891 A | 1/1999 | Becker ........................... 345/7 |
| 5,920,855 A | 7/1999 | Aggarwal et al. ............... 707/3 |
| 5,930,803 A | 7/1999 | Becker et al. ............... 707/104 |
| 5,943,667 A | 8/1999 | Aggarwal et al. ............... 707/3 |
| 5,960,435 A | 9/1999 | Rathmann et al. .......... 707/101 |
| 5,970,482 A | 10/1999 | Pham et al. .................... 706/16 |
| 5,983,222 A | 11/1999 | Morimoto et al. ............... 707/6 |
| 5,991,752 A | 11/1999 | Fukuda et al. .................. 707/1 |
| 6,006,223 A | 12/1999 | Agrawal et al. ................ 707/5 |
| 6,034,697 A | 3/2000 | Becker ........................ 345/433 |
| 6,055,537 A | 4/2000 | LeTourneau ................. 707/101 |
| 6,061,682 A | 5/2000 | Agrawal et al. ................ 707/6 |
| 6,092,064 A | 7/2000 | Aggarwal et al. .............. 707/6 |
| 6,094,645 A | 7/2000 | Aggarwal et al. ............. 706/47 |
| 6,108,004 A | 8/2000 | Medi .......................... 345/346 |
| 6,134,555 A | 10/2000 | Chadha et al. .............. 707/102 |
| 6,138,117 A | 10/2000 | Bayardo | |
| 6,189,005 B1 | 2/2001 | Chakrabarti et al. | |
| 6,301,579 B1 * | 10/2001 | Becker ........................ 707/102 |

OTHER PUBLICATIONS

Klemettinen et al. ("Finding interesting rules from large sets of discovered association rules", ACM, 1994, pp. 401–407).*

Bayardo, R.J., Agrawal, R., Gunopulos, D. "Constraint-Based Rule Mining in Large, Dense Databases" Proceedings of the 15th Int'l Conf. On Data Engineering (1999).

Becker, B.G., "Visualizing Decision Table Classifiers" Silicon Graphics, Inc., Proceedings of Information Visualization '98, pp. 102–105, IEEE Computer Society Press (Oct. 1998).

(List continued on next page.)

*Primary Examiner*—Kim Vu
*Assistant Examiner*—Joon Hwan Hwang
(74) *Attorney, Agent, or Firm*—Woodard, Emhardt, Moriarty, McNett & Henry LLP

(57) ABSTRACT

Disclosed are association rule identification and visualization methods, systems, and apparatus. An association rule in data mining is an implication of the form X→Y where X is a set of antecedent items and Y is the consequent item. A unique visualization technique that provides multiple antecedent, consequent, confidence, and support information is disclosed to facilitate better presentation of large quantities of complex association rules.

29 Claims, 8 Drawing Sheets

OTHER PUBLICATIONS

Becker, B.G., "Volume Rendering for Relational Data", Silicon Graphics, Inc., Proceedings of Information Visualization '97, pp. 87–90, IEEE Computer Society Press (Oct., 1997).

Hetzler, B., Whitney, P., Martucci, L., Thomas, J., "Multi-faceted Insight through Interoperable Visual Information Analysis Paradigms" Pacific Northwest National Laboratory, Proceedings of Information Visualization '98, pp. 137–144, IEEE Computer Society Press (Oct., 1998).

Hetzler, B., Harris, W.M., Havre, S., Whitney, P., "Visualizing the Full Spectrum of Document Relationships", Proceedings of the Fifth International Society for Knowledge Organization (1998).

Miller, N.E., Wong, P.C., Brewster, M., Foote, H., "Topic Islands™ —A Wavelet–Based Text Visualization System", Proceedings of IEEE Visualization '98, pp. 189–196, ACM Press (Oct., 1998).

Risch, J.S., Rex, D.B., Dowson, S.T., Walters, T.B., May, R.A., Moon, B.D., "The STARLIGHT Information Visualization System", Readings in Information Visualization–Using Vision to Think, Morgan Kaufmann (1999).

Thomas, J., Cook, K., Crow, V., Hetzler, B., May, R., McQuerry, D., McVeety, R., Miller, N., Nakamura, G., Nowell, L., Whitney, P., Wong, P.C., "Human Computer Interaction with Global Information Spaces–Beyond Data Mining", Proceedings of British Computer Society Conference, 1999.

Wise, J.A., Thomas, J.J., Pennock, K., Lantrip, D., Pottier, M., Schur, A., Crow, V., "Visualizing the Non–Visual: Spatial Analysis and Interaction with Information from Text Documents", Proceedings of IEEE Visualization '95, pp. 51–58, IEEE Computer Society Press (Oct., 1995).

Wong, P.C., Bergeron, R.D., "30 Years of Multidimensional Multivariate Visualization", Scientific Visualization—Overviews, Methodologies and Techniques, pp. 3–33, IEEE Computer Society Press, (1997).

"IBM DB2 Intelligent Miner for Data" at Universal Resource Locator (URL) www.almaden.ibm.com/cs/quest at least as early as Oct. 5, 2000.

"MineSet" at Universal Resource Locator (URL) www.sgi.com/software/mineset at least as early as Oct. 5, 2000.

A. Bookstein, S.T. Klein, T. Raita, "*Clumping Properties of Content–Bearing Words,*" Journal of the American Society for Information Science, 49(2):102–114, 1998.

SiliconGraphics Computer Systems, MineSet, *Business Solutions Using Data Mining and Visualization*, Nov., 1998.

SiliconGraphics Computer Systems, MineSet 2.6, "*Maximize the Value of Your Data with Advanced Data Mining and Visualization Technology,*" Sep., 1998.

Ramakrishnan Srikant, Department of Computer Science, and Rakesh Agrawal, "*Mining Sequential Patterns: Generalization and Performance Improvements*" San Jose, CA, In Proceedings the Fifth International Conference on Extending Database Technology (EDBT), Avignon, France, Mar. 1996.

Rakesh Agrawal, Department of Computer Science, and Ramakrishnan Srikant, "*Mining Sequential Patterns,*" San Jose, CA, In Proceedings of the International Conference on Data Engineering (ICDE), Taipei, Taiwan, Mar. 1995.

Ying–Huey Fua, Matthew O. Ward and Elke A. Rundensteiner, "*Navigating Hierarchies with Structure–Based Brushes,*" Worcester, MA, Hierarchical Parallel Coordinates for Exploration of Large Datasets, Proceedings IEEE Visualization '99, pp. 43–50, New York, NY, Oct. 29, 1999.

Pak Chung Wong, "*Visual Data Mining,*" IEEE Computer Graphics and Applications, vol. 19, No. 5, Los Alamitos, CA, 1999, Richland, WA, Sep./Oct. 1999.

\* cited by examiner

DATA MINING AND VISUALIZATION TECHNIQUES

CROSS-REFERENCE TO RELATED APPLICATIONS

The present application claims the benefit of commonly owned U.S. Provisional Patent Application No. 60/239,334 filed Oct. 9, 2000, which is hereby incorporated by reference in its entirety.

GOVERNMENT RIGHTS

The U.S. Government has a paid-up license in this invention and the right in limited circumstances to require the patent owner to license others on reasonable terms as provided for by contract no. DE-AC06-76RLO 1830 awarded by the U.S. Department of Energy.

BACKGROUND

The present invention relates to data processing techniques and more particularly, but not exclusively, relates to the discovery and visualization of association rules.

Association is a powerful data analysis technique that finds frequent use in data mining tasks. Given a set of items, $S=\{i_1, i_2, i_j, \ldots, i_n\}$ where $n \geq 2$, an association rule is an implication of the form $X \rightarrow i_j$; where $X \subset S$, and $i_j \notin S$ such that $i_j \notin X$. The set of items $X$ is the antecedent, while the item $i_j$ is the consequent of the association rule. The size of $X$ is between 1 to (n−1) items. The "support" of the rule $X \rightarrow i_j$ is the percentage of items in S that satisfies the union of items in $X$ and $i_j$. The "confidence" of the rule is the percentage of items that satisfies $X$ and also satisfies $i_j$. The support and confidence levels of an association rule are among the metadata frequently of interest to analyzers.

For the given elements A, B, C and D of a common domain, A+B+C→D is an example of an association rule; where the occurrence of A & B & C together imply D. Another example from a supermarket database is "80% of the people who buy diapers and baby powder also buy baby oil." Applying the more general notation from the earlier example, this supermarket database association can be represented in elemental form as A+B=C; where A="buy diapers", B="buy baby powder", and C="buy baby oil." For further background information concerning association rule data mining, reference is made to Pak Chung Wong, Paul Whitney and Jim Thomas, "Visualizing Association Rules for Text Mining" Proceedings of IEEE Information Visualization, (published by IEEE CS Press) (dated Oct. 26, 1999).

In contrast to association rules, another common knowledge discovery and data mining tool is sequential patterning. A four-element sequential pattern can be represented as A→B→C→D; where A, B, C, and D are elements of the same domain. An association rule is a study of "togetherness" of elements, whereas a sequential pattern is a study of the "ordering" or "arrangement" of elements. Further background information about sequential patterns can be found in above cited U.S. Provisional Patent Application No. 60/239,334 filed Oct. 9, 2000.

To support analyses of association rules, scientists and engineers have developed various limited visualization schemes. Among these limited schemes are the two-dimensional item-to-item matrix and the directed graph. The basic design of a two-dimensional (2D) association matrix positions the antecedent and consequent items on separate axes of a square matrix as illustrated in the examples of FIGS. 7 and 8. Customized icons are drawn on certain matrix tiles that connect the antecedent and the consequent items of the corresponding association rules. Different icons can be used to depict different metadata such as the support and confidence values of the rules. FIG. 7 depicts an association rule (B→C). Both the height and the color of the column icon can be used to present metadata values. The values of support and confidence are mapped to 3D columns that are built separately on and beneath the matrix tiles. Alternatively, other icons such as disk and bar can be used to visualize metadata.

This type of item-to-item matrix is frequently effective to show a one-to-one binary relationship; however, it is often less effective when visualizing many-to-one relationships, as in the case of association rules with multiple antecedent items. For example, in FIG. 8 it is unclear if there is only one association rule (A+B→C) or two (A→C and B→C). The lack of a practical way to identify the togetherness of individual antecedent items makes this matrix form a weaker candidate to visualize rules with multiple antecedent items.

In one attempt to address this problem, all the antecedent items of an association rule are grouped as one unit and plotted against its consequent, resulting in an antecedent-to-consequent plot. For example, a dedicated item group (A+B) is created in FIG. 9 to describe the association rule (A+B→C). Unfortunately, as the number of antecedents for a given rule increases, the number of possible item-to-item relationships becomes unwieldy. Furthermore, the loss of item identity within an antecedent group also undermines advantages provided by visualizing the associations with a matrix. For example, the row (or column) of the matrix connected to an item can no longer be used to search for all the rules involving that item.

Another problem with some item-to-item matrix displays is object occlusion, especially when multiple icons are used to depict different metadata values on the matrix tiles. The occlusion problem is illustrated in the example of FIG. 10.

As illustrated in FIG. 11, a directed graph is another possible scheme for depicting item associations. The nodes of a directed graph represent the items, and the edges represent the associations. FIG. 11 shows three association rules (A→C, B→C, A+B→C). Unfortunately, for as few as a dozen rules, a directed graph can often become tangled and difficult to follow. In an attempt to address this problem, the edges are animated to show the associations of certain items with 3D rainbow arcs. See, Beth Hetzler, W. Michelle Harris, Susan Havre, and Paul Whitney, "Visualizing the Full Spectrum of Document Relationships" Proceedings of the Fifth International Society for Knowledge Organization (ISKO) Conference (dated 1998). However, this animation technique typically requires significant human interaction to turn on and off the item nodes, and it is frequently difficult to show multiple metadata values, including support and confidence, alongside the association rules.

Indeed, with any of these existing schemes, it is often difficult to meaningfully visualize a large number of association rules, and effective management of association rules with multiple antecedents is generally lacking. Accordingly, new strategies are needed to identify and present association rule information. The present invention addresses such needs.

SUMMARY OF THE INVENTION

One embodiment of the present invention is a unique data processing technique. Other embodiments include unique apparatus, systems, and methods for processing association rules.

A further embodiment of the present invention includes processing a dataset to determine a number items and establishing several rules with a computer system. These rules each correspond to a different association between two or more of the items. A visualization is provided that displays a rule-to-item relationship for each one of the rules. This visualization can further display one or more types of metadata for the rules. The visualization can be in a two-dimensional or three-dimensional form.

Yet a further embodiment includes: processing a dataset with a computer to determine several association rules and providing a visualization of the association rules; where the association rules each correspond to a different one of a number of portions of the visualization. A set of identifiers is included in the visualization for each one of the association rules. These identifiers each have a different location along the different one of the portions. One of the identifiers represents a consequent item, and one or more other of the identifiers correspondingly represent one or more antecedent items.

In another embodiment, a computer system includes one or more processors operable to process a dataset to determine a number of items and establish a number of association rules for these items. The one or more processors generate a visualization output of the association rules that includes one or more signals representative of a rule-to-item relationship for each one of the association rules. The system further includes an output device responsive to the visualization output to display a visualization of the association rules.

In still another embodiment, a computer apparatus includes logic to generate a visualization of several association rules. This logic comprises an extraction engine operable to determine a number items from a dataset, an association rule mining engine operable to establish the association rules from the items, and a visualization output generator. This generator provides the visualization with a region defined by a first axis and a second axis. The association rules each correspond to a different location along the first axis and the items each correspond to a different location along the second axis to provide a rule-to-item relationship for each of the association rules.

In yet further embodiments, other systems, computer-readable devices, computer information transmission mediums (such as computer networks) are provided that include logic and/or programming instructions to generate one or more unique association rule visualizations of the present invention.

Accordingly, one object of the present invention is to provide a unique data processing technique.

Another object is to provide a unique apparatus, system, device, or method for visualizing association rules.

Further objects, embodiments, forms, features, aspects benefits, and advantages of the present invention will become apparent from the drawings and detailed description contained herein.

DETAILED DESCRIPTION OF SELECTED EMBODIMENTS

Figure 1:
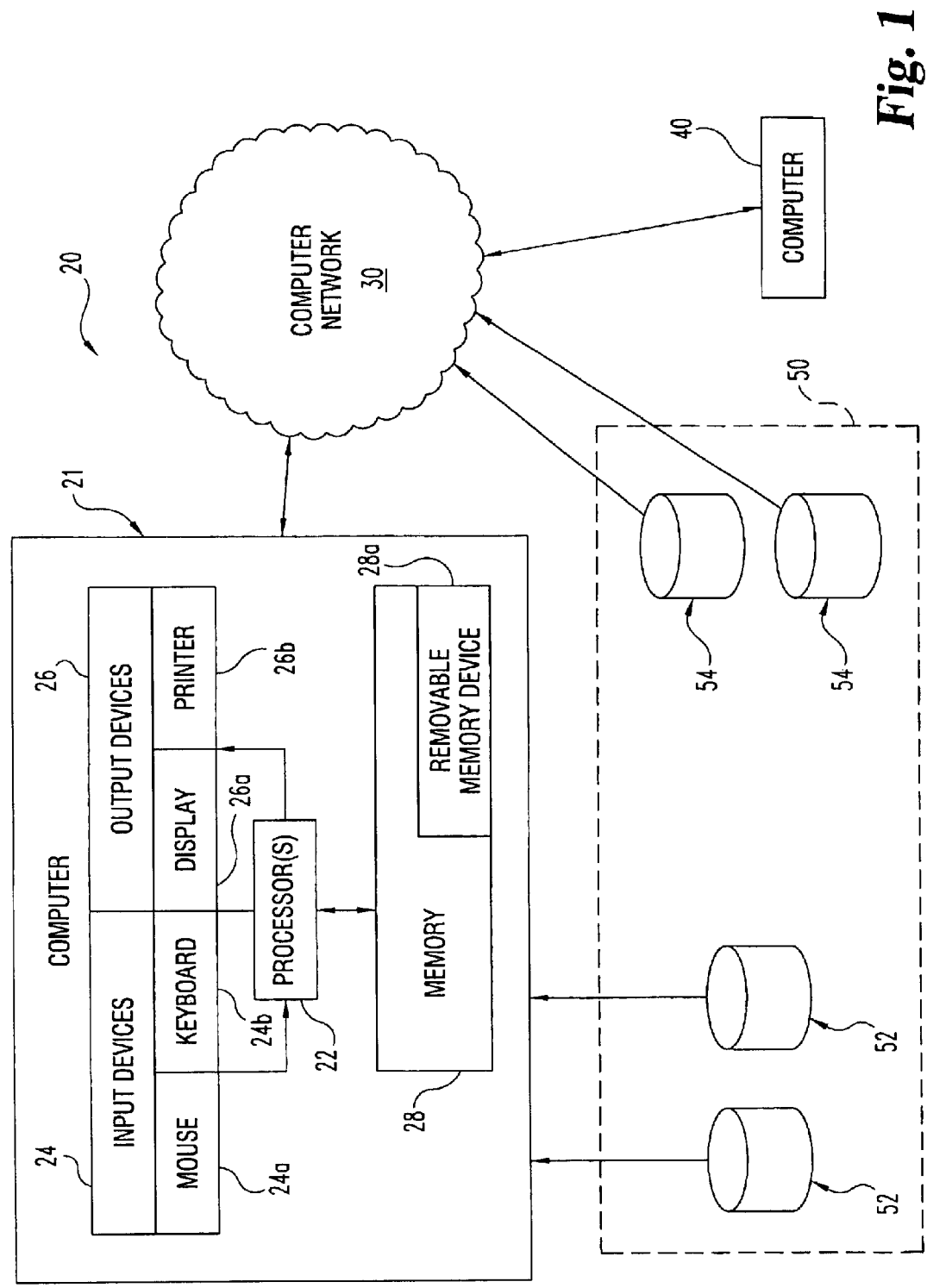
FIG. 1 is a diagrammatic view of a computing system.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 diagrammatically depicts computer system 20 of one embodiment of the present invention. System 20 includes computer 21 with one or more computer processor(s) 22. Processor(s) 22 can be of any type. System 20 also includes operator input devices 24 and operator output devices 26 operatively coupled to processor(s) 22. Input devices 24 include a conventional mouse 24a and keyboard 24b, and alternatively or additionally can include a trackball, light pen, voice recognition subsystem, and/or different input device type as would occur to those skilled in the art. Output devices 26 include a conventional graphic display 26a, such as a plasma, Cathode Ray Tube (CRT), or Liquid Crystal Display (LCD) type, and color printer 26b. Alternatively or additionally output devices 26 can include an aural output system and/or different output device type as would occur to those skilled in the art. Further, in other embodiments, more or fewer operator input devices 24 or operator output devices 26 may be utilized.

System 20 also includes memory 28 operatively coupled to processor(s) 22. Memory 28 can be of one or more types, such as solid-state electronic memory, magnetic memory, optical memory, or a combination of these. As illustrated in FIG. 1, memory 28 includes a removable/portable memory device 28a that can be an optical disk (such as a CD ROM or DVD); a magnetically encoded hard disk, a floppy disk, tape, or cartridge media; or a different form as would occur to those skilled in the art. In one embodiment, at least a portion of memory 28 is operable to store programming instructions for processor(s) 22. Alternatively or additionally, memory 28 can be arranged to store data other than programming instructions for processor(s) 22. In still other embodiments, memory 28 and/or portable memory device 28a may not be present. In one such example, a hardwired state-machine configuration of processor(s) 22 does not utilize memory-based instructions.

System 20 also includes computer network 30 that can include a Local Area Network (LAN); Wide Area Network (WAN), such as the Internet; another type as would occur to those skilled in the art; or a combination of these. Network 30 couples computer 40 to computer 21; where computer 40 is remotely located relative to computer 21. Computer 40 can include one or more processor(s), input devices, output devices, and/or memory as described in connection with computer 21; however these features of computer 40 are not shown to preserve clarity of FIG. 1.

Computer 40 and computer 21 can be arranged as client and server, respectively, in relation to some or all of the data processing of the present invention. For this arrangement, it should be understood that many other remote computers 40 could be included as clients of computer 21, but are not shown to preserve clarity. In another embodiment, computer 21 and computer 40 can both be participating members of a distributed processing arrangement with one or more processors located at a different site relative to the others. The distributed processors of such an arrangement can be used collectively to execute routines according to the present invention. In still other embodiments, remote computer 40 may be absent.

Figure 2:
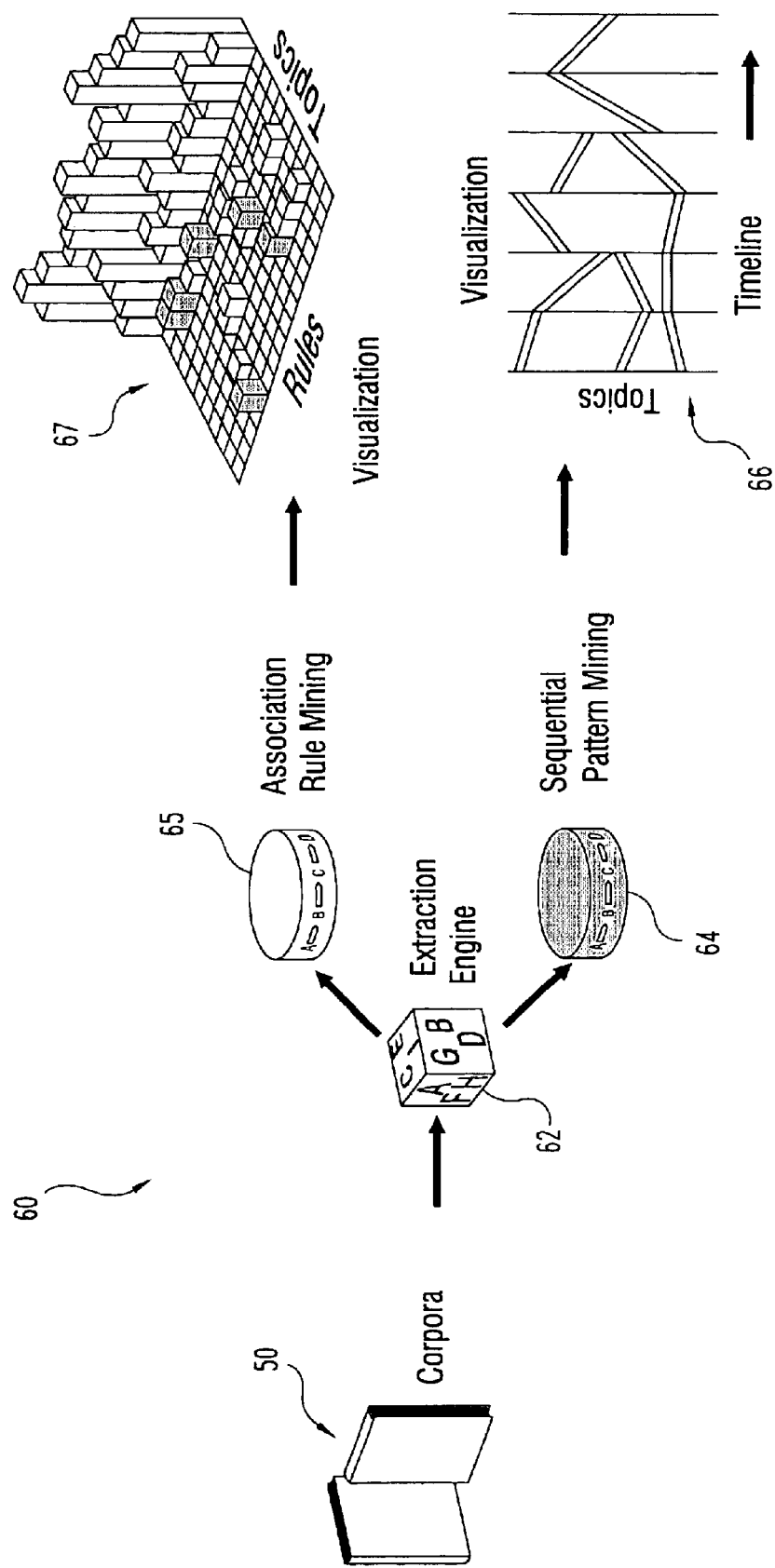
FIG. 2 is a diagrammatic view of various data processing components of the system of FIG. 1.

System 20 is also depicted with computer-accessible data sources or datasets generally designated as corpora 50. Corpora 50 include datasets 52 local to computer 21 and remotely located datasets 54 accessible via network 30. Computer 21 is operable to process data selected from one or more of corpora 50. Referring additionally to FIG. 2, system 20 is defined in terms of selected conceptual data processing components 60. The one or more corpora 50 can be accessed with data extraction engine 62 to selectively extract information according to predefined criteria. Results obtained with extraction engine 62 are submitted to sequential data mining engine 64 and/or association rule data mining engine 65. The data mined with engines 64 or 65 is processed by visualization generator 66 or 67, respectively, to provide a corresponding visualization output. Engines 62, 64, and 65 and generators 66 and 67 are defined through corresponding logic of processor(s) 22. This logic can be of a dedicated, hardwired variety and/or in the form of programming instructions as is suitable for the particular processor arrangement. System 20 is arranged to present a graphic display with one or more of output devices 26 in response to the visualization output provided by generator 66 or 67 and/or transmit the visualization over computer network 30.

Figure 3:
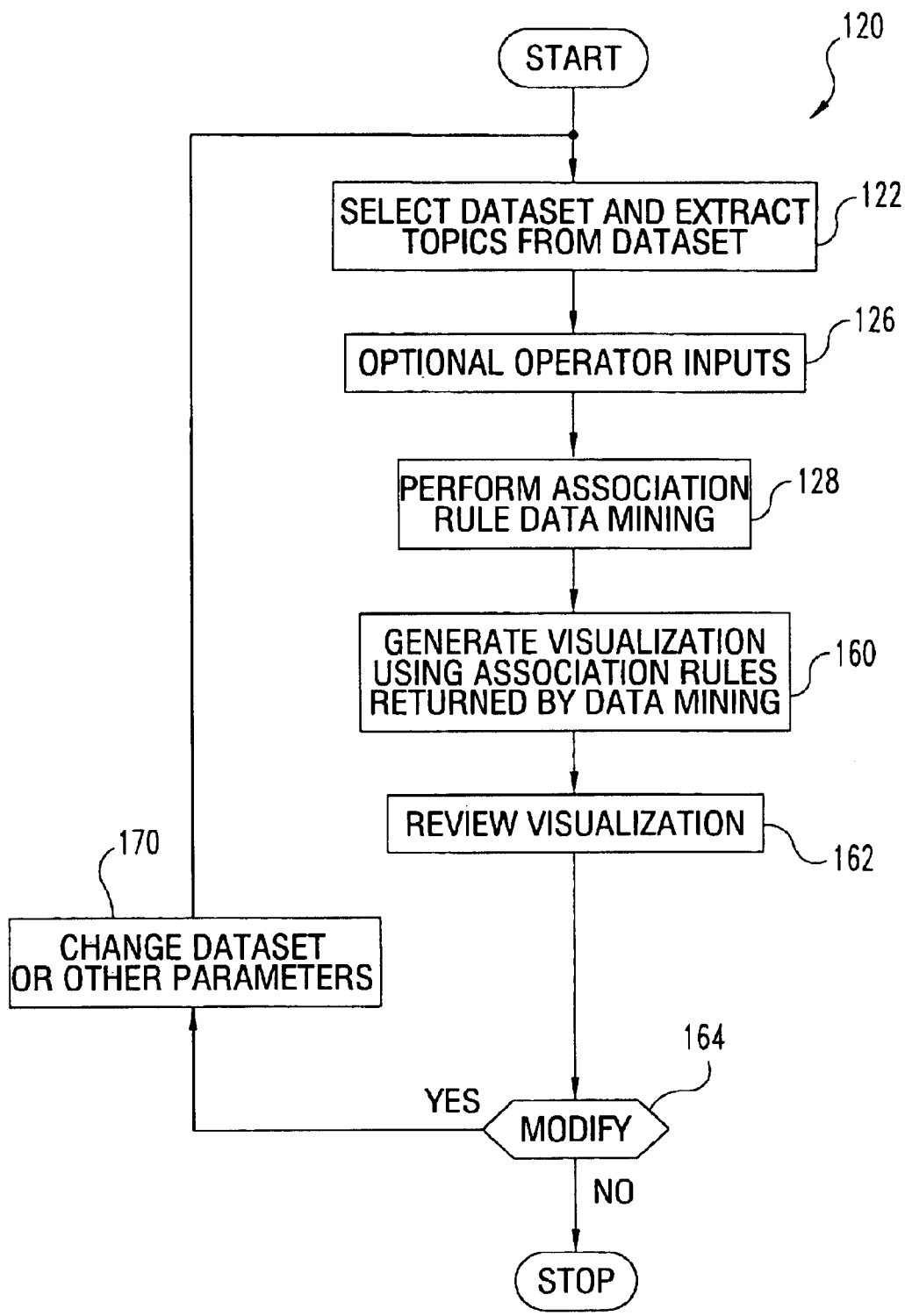
FIG. 3 is a flowchart illustrating details of a data processing routine that can be executed with the system of FIG. 1.

Next, features of the present invention more specifically directed to association rule visualization are described. Referring to FIG. 3, a flowchart of data processing routine 120 for mining and visualizing association rules is depicted. Routine 120 represents one nonlimiting way in which engines 62 and 65 and generator 67 can be implemented. In stage 122 of routine 120, a dataset is selected for processing from the available corpora 50. Topics of interest are extracted from the selected dataset in correspondence to the previously described extraction engine 62.

In one experimental example, a word-based data extraction engine was used to extract a list of content-bearing words from a news article corpus obtained from open sources. This corpus has a size of about ~9MB and is stored as an ASCII file with more than 3,000 articles collected during Apr. 20–26, 1995. The news articles of the corpus have a strong theme associated with the bombing of the U.S. Federal Building in Oklahoma. Other major news stories during the week include the Simpson trial, the Unabomber, the Bosnian crisis, and the France election.

In operation, the word-based extraction engine selects an interesting subset of words. Words separated by white spaces in a corpus can be evaluated within the context of the corpus to assess whether a word warrants inclusion as a topic. In one embodiment, Bookstein's techniques regarding identification of content-bearing words are used to assess the relative contribution of a word to the content of the corpus. These techniques are further described in A. Bookstein, S. T. Klein, and T. Raita, "Clumping Properties of Content Bearing Words," *Journal of the American Society for Information Science*, 49(2), pp. 102–114 (dated 1998). The co-occurrence or lack of co-occurrence of candidate topic words in documents is used to evaluate the strengths of the words. Stemming is used to remove suffixes so that similar words are represented by the root word. Commonly appearing words that do not directly contribute to the content—such as prepositions, pronouns, adjectives, and gerunds—are ignored. The result is a set of content-bearing words that represent the major topics (or themes) of the corpus. Table 1 below shows the top twenty topic words generated from this form of engine 62 as follows:

TABLE 1

| Topic | News Story |
| --- | --- |
| billion | Congress and budget |
| Neufeld | Simpson trial |
| Korea | North/South Korea nuclear |
| Chirac | France election |
| tribunal | Bosnian crisis |
| Bosnian | Bosnian crisis |
| Unabomber | Unabomber |
| CIA | Unabomber |
| Mazzola | Simpson trial |
| treaty | North/South Korea nuclear |
| Jospin | France election |
| Serb | Bosnian crisis |
| McVeigh | Oklahoma bombing |
| Simpson | Simpson trial |
| Nichols | Oklahoma bombing |
| Nuclear | North/South Korea nuclear |
| Sarajevo | Bosnian crisis |
| Ito | Simpson trial |
| Koernke | Oklahoma bombing |
| refugee | Bosnian crisis |

In another experimental example, a concept-based extraction engine was used for engine 62 that resulted in concepts (represented as word groups) based on the corpus.

Routine 120 proceeds from stage 122 to stage 126 to permit operator input of selected parameter(s) for computing association rules from the extracted topics. Stage 126 can support the selection of confidence and/or support levels for the association rule analysis.

Routine 120 proceeds from stage 126 to stage 128. In stage 128, association rules are determined in accordance with input(s) from stage 126 using any of a number of data mining techniques known to those skilled in the art. For the experimental example resulting in Table 1, the topic words from the word-based form of engine 62 were fed into the mining engine 65 to compute the association rules according to the requested confidence and support values. Table 2 shows a sample of topic association rules with confidence $\geq 80\%$ and support $\geq 1\%$ generated from the April 1995 news corpus as follows

TABLE 2

| Antecedent | Consequent | Confidence | Support |
| --- | --- | --- | --- |
| Manager & McVeigh & Michigan & motel & Nichols & sketch | Truck | 91.30% | 1.39% |
| Ito & court & jury & Mazzola & testimony | Simpson | 100.00% | 1.72% |
| France & election & socialist | Chirac | 97.30% | 1.19% |
| Blood & testimony | Fung | 81.25% | 1.29% |
| Court & judge & jury | Ito | 96.49% | 1.81% |
| Blood & vial | Mazzola | 100.00% | 1.19% |
| Ammonium & nitrate & bomb & FBI | Nichols | 89.13% | 1.35% |
| Bomb & cult & Michigan & militia | McVeigh | 100.00% | 1.22% |
| Hutu & Rwanda | Refugee | 92.86% | 1.29% |
| Bosnia & Bosnian & Crimes | Serb | 100.00% | 1.22% |
| Bosnia & Serb & Sarajevo | War | 90.48% | 1.25% |
| Cult & gas & subway | Tokyo | 95.00% | 1.88% |

Figure 4:
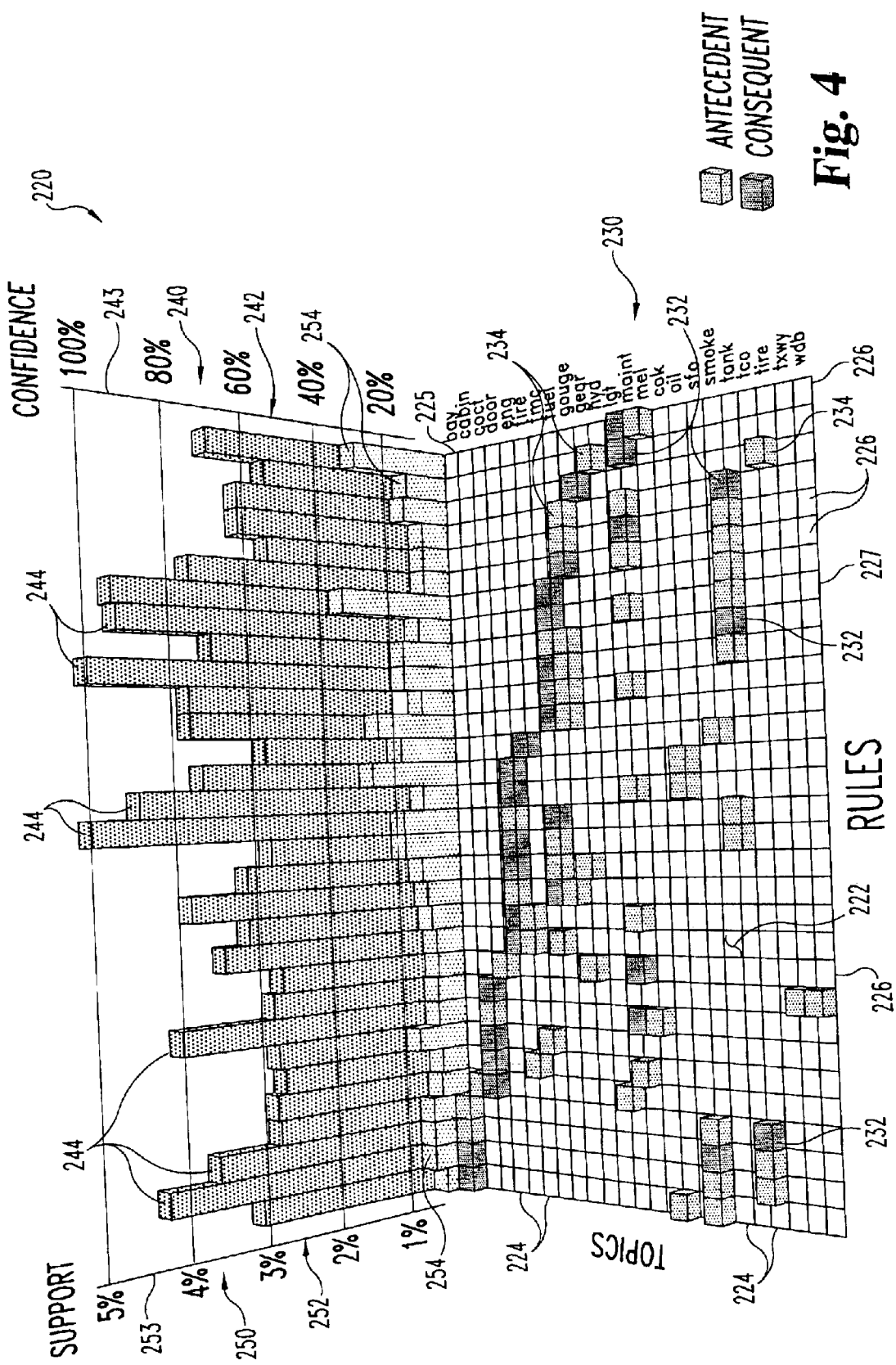
FIG. 4 is a visualization of rule-to-item relationships of the type that can be generated with the routine of FIG. 3.

Referring back to FIG. 3, routine 120 proceeds from stage 128 to stage 160. In stage 160, a visualization output is provided with generator 67 that corresponds to the association rules identified in stage 128. FIG. 4 provides one example of a three-dimensional (3D) perspective visualization 220 generated in accordance with the present invention. This visualization format provides a way to depict "many-to-one" association rules by using a matrix to depict "rule-to-item" relationships instead of the item-to-item relationships common to the forms previously described. FIG. 4 includes planar matrix region 222 with a grid pattern. In FIG. 4, the rows 224 extend along axis 225 of region 222 and represent the items (or topics in the context of text mining) as listed along the left, and the columns 226 extend along axis 227 and represent the item associations or rules. Accordingly, each item corresponds to a different location along axis 225 and each rule corresponds to a different location along axis 227. Only a few of rows 224 and columns 226 are specifically designated by reference numerals to preserve clarity.

Visualization 220 includes a number of different visual identifiers 230. For example, the darker blocks projecting from region 222 represent antecedent items, a few of which are designated by reference numeral 232; and the lighter blocks projecting from region 222 represent the consequent items, a few of which are designated by reference numeral 234. In one experimental form, color is used to distinguish the aritecedent and consequent identifiers, with the former being blue and the later being red. In still other forms, different colors, shading, shaping, dimensions, hatching, and/or other patterning could be used to distinguish the antecedent and consequent identifiers.

Besides antecedent items 232 and consequent items 234, other identifiers 230 indicate various metadata attributes. For example, the confidence and support levels of the rules are given by the corresponding bar charts 240 and 250 in different scales at the far end of the matrix. The confidence bar chart 240 has scale 242 along axis 243 on the right. The support bar chart 250 has scale 252 along axis 253 on the left. The support bar chart 250 is in front of confidence bar chart 240 in visualization 220. Only a few representative bars 244 of chart 240 and bars 254 of chart 250 are specifically designated to preserve clarity. As in the case of the blocks for antecedent and consequent identifiers, bars 244 and 254 can be distinguished by different visual patterns such as different coloration, hatching, shading, shaping, dimensioning and the like.

In other embodiments, support level, confidence level, or both could be presented in a different form of chart, such as a line or area graph, or presented above and/or below region 222 to name just a few. For other alternative embodiments, different metadata attributes can be depicted or metadata attributes could be absent from the visualization. In yet another embodiment of the present invention, the rule-to-item relationships are visualized in a two-dimensional (2D) form with consequent and antecedent items being represented by nonprojecting icons. In one form of a 2D embodiment, each box or column identifier is replaced with a pixel (or block of pixels) identifier, where pixel colors are used to indicate the item type and/or metadata attributes.

It has been found that the visualization techniques of the present invention provide a desirable organization of association rules and related metadata for a quantity of at least several hundred association rules when displayed on a common 17-inch graphic monitor screen; where such rules can include dozens of antecedents. Unlike item-to-item matrix visualizations, for desired applications the approach of the present invention facilitates presentation of a large number of antecedents with little or no occlusion and without creation of additional "multiple antecedent" row or column entries. Furthermore, it permits analysis of the distributions of the association rules (horizontal axis) as well as the items within (vertical axis) simultaneously. This approach also can often simplify the presentation relative to schemes that require screen swapping, animation, or complex human interaction to analyze the rules.

Once generated, the visualization is examined in stage 162. The stage 162 examination can be performed by one or more parties interested in the particular association rule knowledge being sought. Examples of applications of association rule data mining and/or visualization in accordance with the present invention include, but are not limited to merchandise stocking, insurance fraud investigation, and climate prediction. Stage 162 can also include operator input options to: present the visualization on display 26a and/or printer 26b; modify various parameters of the visualization (such as hide one or more patterns, change support or confidence indicators, etc . . . ); review extracted topic information underlying the visualization (with or without support values); and/or store extraction data or visualization information in memory 28. For one form of visualization presented on display 26a, routine 120 provides a zoom-in/zoom-out capability via mouse 24a or another pointing device to support context and focus analysis of the visualized association rules.

From the examination of stage 162, routine 120 proceeds to conditional 164 to determine if adjustments to selected processing parameters are desired to further refine or redirect the operations in stages 122, 124, 130, and/or 160. If such changes are desired, the affirmative branch of conditional 164 leads to stage 170. In stage 170, several selections are provided, including, for example: an option to choose one or more different datasets for extraction; a filter to select only a subset of the previously extracted topics and/or screen-out one or more unwanted topics from the previously processed dataset; and/or an adjustment to visualization layout, colors, shapes, shading, or the like. Preferably, these options are provided in a Graphical User Interface (GUI) form. By way of nonlimiting example, a pop-up menu with a check box for each extracted topic can be used to restrict items to be included in a given visualization.

While stage 170 is depicted as returning to stage 122, it should be understood that in practice, the re-execution of routine 120 may be resumed at one or more of the other stages, depending on the adjustments made. Indeed, in an alternative embodiment, the option to adjust selected parameters can be presented as part of the execution of a corresponding stage. Also, it should be appreciated that routine 120 can be executed a number of times to obtain different visualization outputs for comparison through this processing loop. Once conditional 164 is encountered and the corresponding test is negative, routine 120 terminates.

Figure 5:
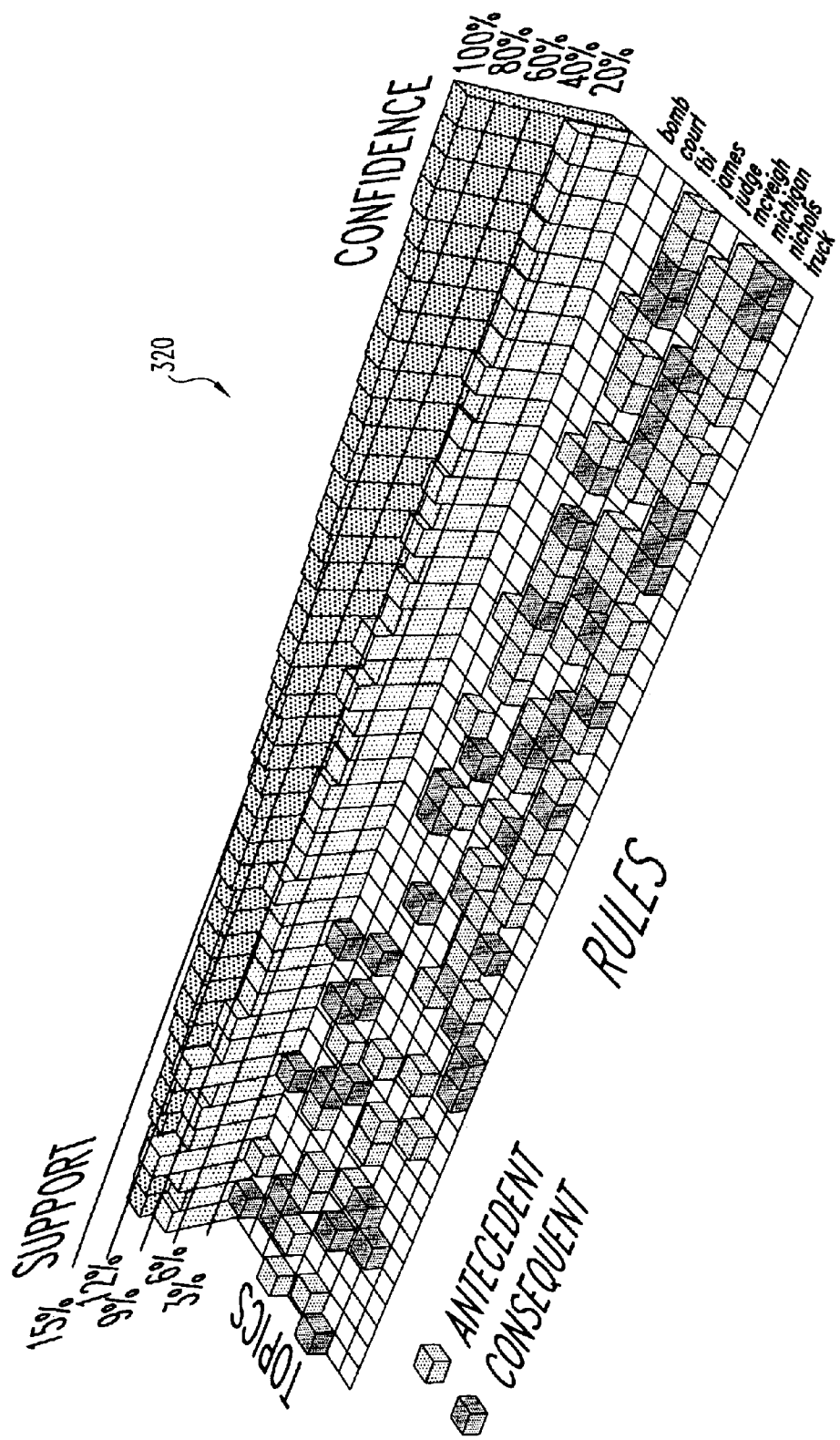
FIG. 5 is an association rule visualization generated with the routine of FIG. 3 for another data processing example.
Figure 6:
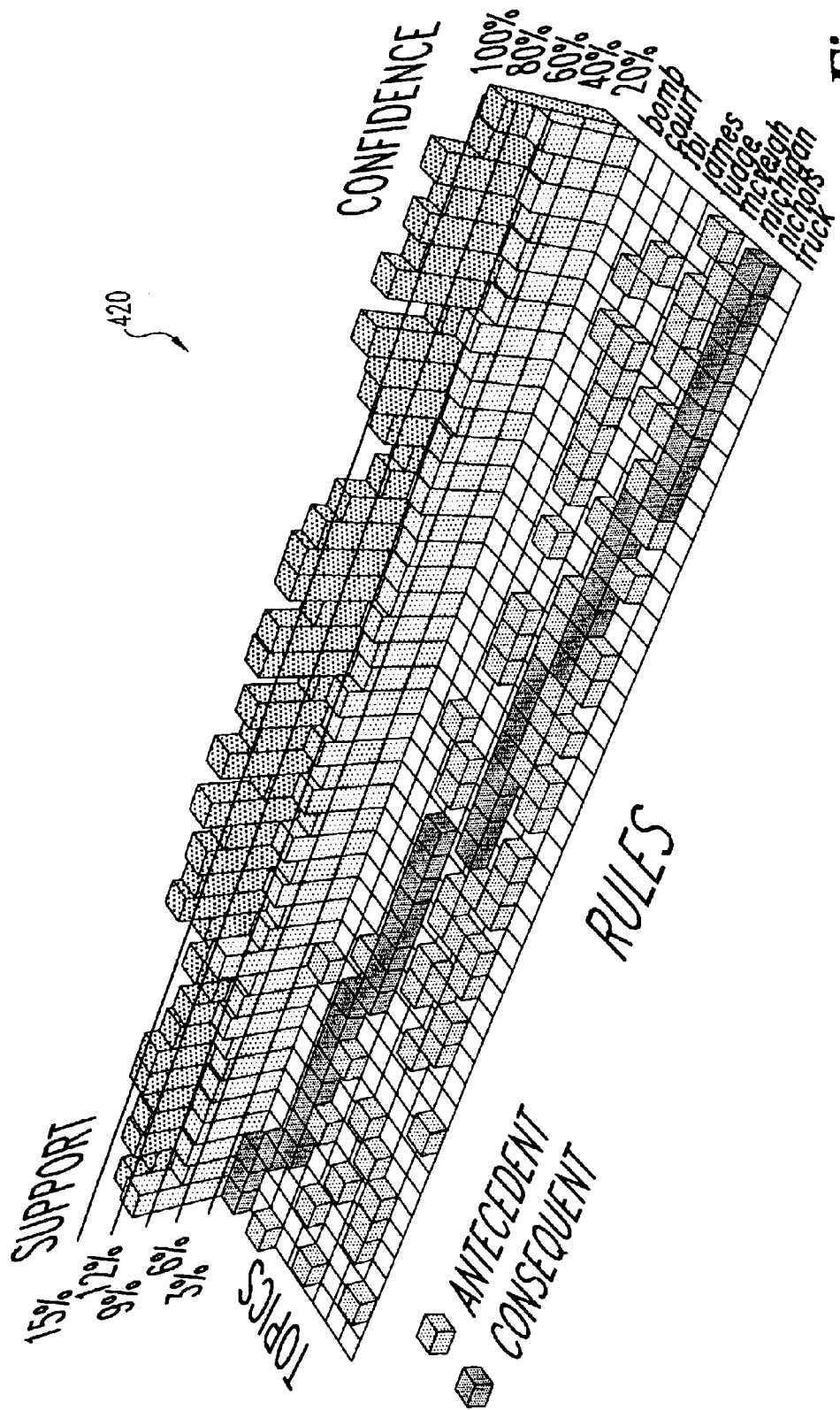
FIG. 6 is an association rule visualization generated with the routine of FIG. 3 utilizing the same data as for the example of FIG. 5, but with a different topic organization.
Figure 8:
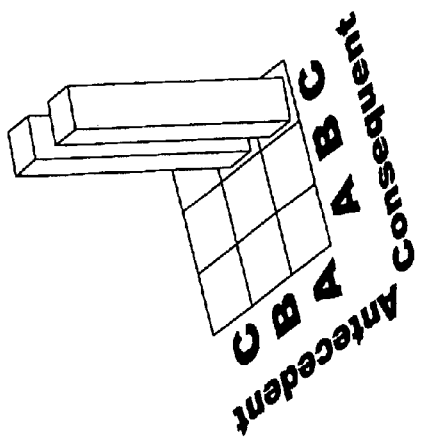
FIG. 8 is an item-to-item association matrix with multiple columns to represent different association rules for which it is difficult to identify corresponding antecedents.
Figure 9:
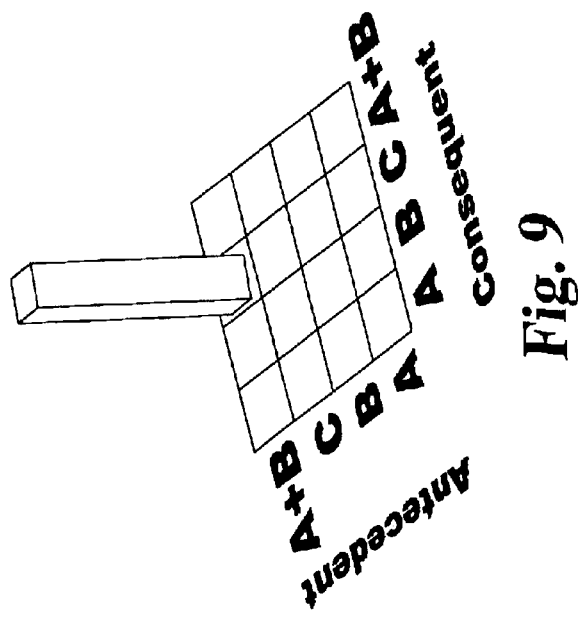
FIG. 9 is another type of item-to-item association matrix that includes dedicated entries for multiple antecedent groupings.
Figure 7:
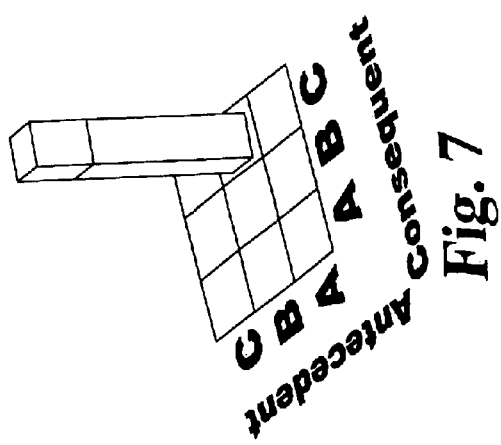
FIG. 7 is an item-to-item matrix with a column to indicate a representative association rule, where column color can be used to represent medadata values of the association rule such as support and confidence.
Figure 10:
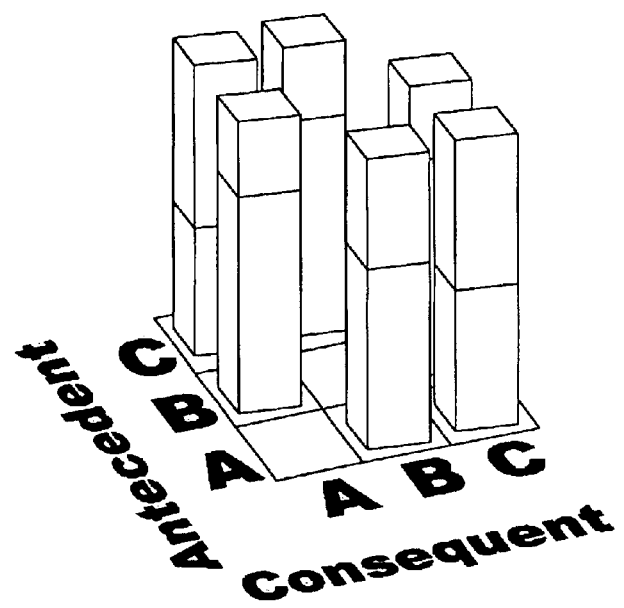
FIG. 10 is an item-to-item association matrix with multiple association rule columns, some of which are occluded.
Figure 11:
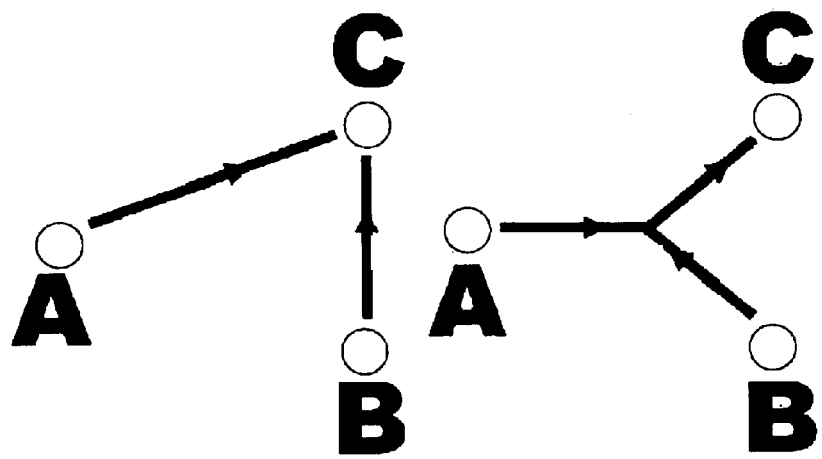
FIG. 11 is a directed graph to depict item associations.

FIGS. 5 and 6 provide further examples of visualizations 320 and 420, respectively. Visualizations 320 and 420 are presented in accordance with the features previously described in connection with visualization 220 of FIG. 4. More specifically, visualization 320 of FIG. 5 depicts a set of topic association rules extracted from the April 1995 news corpus with support≧6% and confidence ≧60%. The rules of visualization 320 are listed in ascending order from the left side according to the confidence values. Visualization 320 can be used to study different aspects of the topic associations, including the topic distribution of selected rules and the correlation between different metadata values. Visualization 420 of FIG. 6 shows a different arrangement of the same set of association rules as shown in FIG. 5. In visualization 420, the association rules are ordered by the consequent items, such that all the associations with the same consequent items are group together for analysis.

Many other embodiments of the present invention are envisioned. For example, while the applications previously described are in terms of a text-based corpus, association rules for other forms of data can be visualized in accordance with the teachings of the present invention. In a further embodiment of the present invention, one or more visualized aspects may be absent or combined with other features. In one such alternative, multiple antecedents are not individually shown. Alternatively or additionally, support level, confidence level, or both could be absent or presented in a combined manner.

In further embodiments, an apparatus, method, system, device, or computer transmission medium for providing an association rule visualization according to the present invention is applied specifically to processing of one or more dataset types including: merchandise stocking information, insurance fraud investigation data, climate prediction information, medical insurance claim data, bioinformatic data, genomic data, drug performance data, and/or information relating to risk factors for military operations.

In another embodiment, the techniques for processing and/or visualizing association rules are integrated with any of the methods, systems, or apparatus identified for discovering and/or visualizing sequential patterns in the commonly owned U.S. Provisional Patent Application No. 60/239,334 filed Oct. 9, 2000.

Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding. All publications, patents, and patent applications cited in this specification are herein incorporated by reference as if each individual publication, patent, or patent application were specifically and individually indicated to be incorporated by reference and set forth in its entirety herein. While the invention has been illustrated and described in detail in the drawings and foregoing description, the same is to be considered as illustrative and not restrictive in character, it being understood that only selected embodiments have been shown and described and that all changes, equivalents, and modifications that come within the spirit of the invention described herein or defined by the following claims are desired to be protected.

What is claimed is:

1. A method, comprising:

processing a dataset with a computer system to determine a number items;

establishing several rules with the computer system, the rules each corresponding to a different association between two or more of the items;

providing a visualization of the rules;

displaying a rule-to-item relationship in the visualization for each one of the rules; and wherein the rules each correspond to a different location along a first axis of the visualization and the items each correspond to a different location along a second axis of the visualization, and further comprising displaying a first metadata attribute for each of the rules along a third axis of the visualization with the computer system.

2. The method of claim 1, wherein said displaying includes providing a number of visual identifiers in the visualization for each one of the rules, one of the identifiers representing a consequent member of the items and one or more other of the identifiers correspondingly representing one or more antecedent members of the items.

3. The method of claim 2, wherein a further one of the identifiers represents a support or confidence level.

4. The method of claim 3, wherein each of the rules corresponds to a respective portion of a planar region of the visualization and for each respective one of the rules, the identifiers each project from the respective portion of the planar region at a different location.

5. The method of claim 1, wherein the first axis, second axis, and third axis define a three-dimensional perspective form of the visualization.

6. A method, comprising:

processing a dataset with a computer to determine several association rules;

providing a visualization of the association rules, the association rules each corresponding to a different one of a number of portions of the visualization;

including a set of identifiers in the visualization for each respective one of the association rules, the identifiers each having a different location along the different one of the portions, one of the identifiers representing a consequent item of the respective one of the association rules, one or more other of the identifiers correspondingly representing one or more antecedent items of the respective one of the association rules; and wherein the visualization is in a three-dimensional perspective form with the association rules corresponding to a first axis, the set of items corresponding to a second axis, and one or more metadata attributes for each of the association rules corresponding to a third axis.

7. The method of claim 6, further comprising:

determining the one or more metadata attributes for each of the association rules with the computer.

8. The method of claim 7, wherein the one or more metadata attributes number at least two and include a support attribute and a confidence attribute.

9. The method of claim 6, wherein the number of portions belong to a planar region of the visualization and the identifiers for the respective one of the association rules each project from the different one of the portions.

10. The method of claim 6, wherein said processing includes establishing a set of items from the dataset, the consequent item and the one or more antecedent items for each one of the association rules belonging to the set of items, and further comprising:

evaluating the visualization;

selectively screening the set of items; and generating another visualization after said screening.

11. The method of claim 6, further comprising:

accessing the dataset over a computer network coupled to the computer; and transmitting an output corresponding to the visualization over the computer network.

12. The method of claim 6, further comprising modifying the visualization with an operator input device coupled to the computer.

13. A computer apparatus, comprising: logic to generate a visualization of several association rules, the logic including:

an extraction engine operable to determine a number of items from a dataset;

an association rule mining engine operable to establish the association rules from the items, the rules each corresponding to a different associative relationship between two or more of the items; and a visualization output generator to define the visualization relative to a first axis, a second axis, and a third axis, the association rules each corresponding to a different location along the first axis, the items each corresponding to a different location along the second axis to provide a rule-to-item relationship for each one of the association rules, and a metadata attribute for each of the association rules being represented along the third axis.

14. The apparatus of claim 13, wherein the apparatus is in the form of a removable memory device, and the logic is in the form of a number of programming instructions encoded on said removable memory device.

15. The apparatus of claim 13, wherein the apparatus includes at least a portion of a computer network carrying the logic and the logic is in the form of a number of electronic programming instructions in a transmission format for said computer network.

16. The apparatus of claim 13, wherein said visualization output generator is further operable to depict the region as a planar area and the association rules each correspond to a different portion of the planar area.

17. The apparatus of claim 16, wherein the visualization output generator is further operable to provide a number of visualization identifiers for each respective one of the association rules, the identifiers each project from the different portion of the planar area at different corresponding locations, one of the identifiers represents a consequent member of the items for the respective one of the association rules, and one or more other of the identifiers correspondingly represent one or more antecedent members of the items for the respective one of the association rules.

18. The apparatus of claim 13, further comprising means for processing sequential patterns.

19. The apparatus of claim 13, further comprising means for modifying the visualization in response to an operator input.

20. A method, comprising:

processing a dataset with a computer to determine a number of items;

determining several association rules relative to the items, the association rules including a consequent belonging to the items and one or more antecedents belonging to the items; and displaying a visualization of the association rules in which the association rules each correspond to a unique position along a first axis, the items each correspond to a unique position along a second axis, and one or more metadata attributes for each of the association rules is represented along a third axis.

21. The method of claim 20, further comprising:

determining the one or more metadata attributes for each of the association rules with the computer.

22. The method of claim 21, wherein the one or more metadata attributes number at least two and include a support attribute and a confidence attribute.

23. The method of claim 20, which includes: for each of the association rules, representing the consequent and the one or more antecedents in the visualization by a corresponding number of uniquely positioned identifiers each projecting from a planar region of the visualization, the planar region being coincident with the first axis and the second axis.

24. The method of claim 20, which includes for each one of the association rules, representing the consequent by a color different than the one or more antecedents in the visualization.

25. The method of claim 20, further comprising:

accessing the dataset over a computer network coupled to the computer; and transmitting an output corresponding to the visualization over the computer network.

26. The method of claim 20, further comprising modifying the visualization with an operator input device coupled to the computer.

27. The method of claim 20, which includes: for each corresponding one of the association rules, representing the consequent and the one or more antecedents by a corresponding number of identifiers in different positions along the second axis and in the same position along the first axis for the corresponding one of the association rules.

28. The method of claim 27, which includes illustrating at least two metadata attributes in the visualization for each of the association rules along a third axis.

29. The method of claim 28, which includes for each of the association rules, representing the consequent by a color different than the one or more antecedents in the visualization.

* * * * *